(12) United States Patent
Chen et al.

(10) Patent No.: US 6,870,712 B2
(45) Date of Patent: Mar. 22, 2005

(54) INDUCTIVE WRITER WITH FLAT TOP POLE AND PEDESTAL DEFINED ZERO THROAT

(75) Inventors: Yingjian Chen, Fremont, CA (US); James Wang, Milpitas, CA (US); Qing He, Fremont, CA (US); Zi-Wen Dong, Union City, CA (US); David J. Seagle, Morgan Hill, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 0 days.

(21) Appl. No.: 09/875,601

(22) Filed: Jun. 5, 2001

(65) Prior Publication Data

US 2002/0181162 A1 Dec. 5, 2002

(51) Int. Cl.[7] .............................................. G11B 5/147
(52) U.S. Cl. ...................................................... 360/317
(58) Field of Search ................................ 360/317, 125, 360/126, 113, 319; 29/603.14, 603.21

(56) References Cited

U.S. PATENT DOCUMENTS

| | | | | |
|---|---|---|---|---|
| 6,172,848 B1 | * | 1/2001 | Santini | 360/126 |
| 6,317,288 B1 | * | 11/2001 | Sasaki | 360/126 |
| 6,317,289 B1 | * | 11/2001 | Sasaki | 360/126 |
| 6,339,523 B1 | * | 1/2002 | Santini | 360/317 |
| 6,466,402 B1 | * | 10/2002 | Crue et al. | 360/126 |
| 6,469,876 B1 | * | 10/2002 | Sasaki et al. | 360/317 |
| 6,477,005 B1 | * | 11/2002 | Sasaki | 360/126 |
| 6,504,678 B1 | * | 1/2003 | Kamijima | 360/126 |
| 6,549,370 B1 | * | 4/2003 | Kamijima | 360/126 |
| 6,553,649 B1 | * | 4/2003 | Santini | 29/603.14 |

* cited by examiner

Primary Examiner—Angel Castro
(74) Attorney, Agent, or Firm—Stetina Brunda Garred & Brucker

(57) ABSTRACT

A disk drive write head (10) having a bottom pole (60), a first insulation layer (64) formed on the bottom pole (60), a coil (38) formed on the first insulation layer (64), a second insulation layer (66) formed on the coil (38), a write gap layer (76) formed on the second insulation layer (66), and a top pole (12) formed on the write gap layer (76), where the top pole (12) is substantially flat.

A second embodiment (100) is described which is produced by a damascene process.

6 Claims, 7 Drawing Sheets

INDUCTIVE WRITER WITH FLAT TOP POLE AND PEDESTAL DEFINED ZERO THROAT

TECHNICAL FIELD

The present invention relates generally to inductive write heads used in magnetic media storage devices, and more particularly to magneto-resistive disk drive heads.

BACKGROUND ART

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" into which the read/write sensors are imbedded during fabrication. The goal in recent years is to increase the amount of data that can be stored on each hard disk. If data tracks can be made narrower, more tracks will fit on a disk surface, and more data can be stored on a given disk. The width of the tracks depends on the width of the read/write head used, and in recent years, track widths have decreased as the size of read/write heads have become progressively smaller. This decrease in track width has allowed for dramatic increases in the recording density and data storage of disks.

In a magneto-resistive (MR) sensor changes in the strength and orientation of magnetic fluxes are sensed as changes in electric resistance, as an MR read head encounters changes in magnetic data, as on a computer hard drive. In such an MR sensor, the read head operates based on the anisotropic magneto-resistance (AMR) effect in which the resistance of the read element varies in proportion to the square of the cosine of the angle between the magnetization and the direction of sense current flowing through the sensor. This effect is relatively weak in magnitude, and consequently more attention has been paid in recent years to what is referred to as "spin valve (SV) effect" or "giant magneto-resistance (GMR) effect" because of its relatively large magnitude of effect.

In this type of MR sensor, the resistance of a layered magnetic sensor varies due to both spin-depending transfer of conduction electrons between magnetic layers (M1, M2) via a non-magnetic layer (N), and spin-depending scattering at the interfaces between the layers accompanying the transfer of conduction electrons. The in-plane resistance between the pair of ferromagnetic layers (M1, M2), separated by a non-magnetic layer (N), varies in proportion to the cosine of the angle between the magnetization in the two ferromagnetic layers.

In ferromagnetic materials, scattering of electrons depends on the spin on the carriers. Resistivity is proportional to the scattering of electrons. Electrons with spins parallel to the magnetization direction experience very little scattering and hence provide a low-resistance path. If magnetization of one side of this triple layer (M2) is pinned and M1 is gradually rotated from a parallel to an anti-parallel direction, the resistance of the structure increases in proportion to the cosine of the angle of magnetizations of the two layers M1, and M2. The spin valve is sensitive at low fields because the ferromagnetic layers are uncoupled, therefore a small magnetic field from the magnetic media can rotate the magnetization in one layer relative to the other.

A constant current passes through the sensing region from one electrode terminal (not shown) to another electrode terminal. The total electric resistance of the spin valve changes in proportion to a cosine of an angle between the magnetization direction of the pinned magnetic layer (M2) and the magnetization direction of the free magnetic layer (M1). When the total electric resistance is changed, a voltage difference between the electrode terminals changes and is sensed as read information.

This type of head for writing data is generally configured with two poles separated by a gap layer of non-magnetic material. A typical prior art read/write head is shown in FIG. 4. Layers are generally deposited upon one another and generally include a shield layer 54, a dual gap layer 56, which surround a Magneto-resistive sensor, called MR sensor 58, a pole piece layer, which will be referred to as the bottom pole or P1 60, a non-magnetic gap layer 62, a first insulation layer or I1 64, upon which the coils 38 lie, and a second insulation layer, usually referred to as I2 66, which is generally made from photo-resist material 68. The top pole 42 is next, and is also commonly referred to as P2. The bottom and top poles 60, 42 each have bottom and top pole tips 72, 44 respectively with pole write gap 76 between them. The Air Bearing Surface (ABS) 46 and the coating layer 48 are also shown, as well as a back gap 78. The top and bottom poles 42, 60, typically extend from the ABS 46 in a roughly parallel manner until the top pole 42 veers upward to accommodate the thickness of the coils 38 and insulation layers I1 64 and I2 66. The distance through which the poles 42, 60 travel in parallel before diverging is referred to as the throat height 80, and the point at which the divergence occurs is commonly referred to as the zero throat line 82.

There are several difficulties in manufacturing a write head such as the one shown in FIG. 4. The top pole 42 is obviously contoured from the zero throat line 82 as it extends backwards from the ABS 46. The precise control of deposition processes is more difficult when dealing with contoured surfaces. Difficulties are especially encountered when using advanced photolithography techniques involving very short wavelengths of light. DUV or EUV light can only be adequately focused within a very shallow range of depth. In addition, uniform thickness of photoresist material is difficult to achieve when there are variations in contour. Magnetic properties of deposited materials are also less uniform when processed onto a contoured surface. Additionally, there are typically shadow effects when attempting to do dry etch processes near tall structures, as the etching beam is preventing from reaching into the bottom of topographical features. In order to completely clean out these areas, the tendency is to over-mill certain other surrounding areas while attempting to mill these shadowed areas properly. This can lead to unacceptable defects and poor manufacturing yields.

These problems are compounded as the top pole becomes narrower and narrower in order to decrease track widths and increase data storage density. The fabrication of the top pole is, in fact, becoming a limiting factor in the quest for narrower track width. For data densities of 100 gigabits per square inch and above, the track width must be less than 0.2 microns, meaning the top pole must be also on this order of size. This requires a very narrow and tall structure, with all the associated problems discussed above, when a top pole with a contoured top surface is used.

Thus, there is a great need for a write head having a flat top pole, which is thus easier to manufacture and which can be produced with more precise control, and for a method of manufacture which produces this type of write head having a flat top pole.

SUMMARY OF THE INVENTION

A new write head is disclosed for a magnetic recording density of 70 Gb/in$^2$ and beyond by producing extremely narrow writer trackwidth, which has a pedestal-defined zero-throat, and a flat top pole. The top pole is fabricated onto a planerized surface, so that advanced photolithography, such as DUV lithography technique can be used for critical dimension control. The pedestal is made of high moment electroplated or sputtered materials. This invention also utilizes single coil layers with narrow coil pitch.

In more detail, the pedestal can be made of electroplated NiFe or CoNiFe alloys, which are plated into photolithographically defined patterns. If the pedestal is made of sputtered high moment FeXN or CoFeN materials, an ion milling process is used to pattern the pedestal that defines the zero-throat. In this case, it is possible to leave a tapered edge near the bottom of the pedestal to allow better passage of flux. The coils can be fabricated before or after the pedestal process. In the case of a sputtered pedestal, it is preferred that the coil is made after the pedestal process. There are several different ways of fabricating coils with the existence of pedestal topography. Direct print using conventional photolithography may not be suitable for narrow coil pitch. The tri-level image transfer process may be employed, instead. Alternatively, a damascene coil process can also be utilized. If the pedestal is electroplated, the coils can be fabricated prior to the pedestal. A thin cured photoresist layer can be used for coil insulation, which is subsequently covered by a blanket of aluminum oxide insulation layer. The pedestal is planerized together with the aluminum oxide by chemical mechanical polishing (CMP). After this the write gap is deposited and the necessary via contacts are opened by wet or dry etch. The top pole can be made of single or bi-layer high moment materials, which are partially or entirely electroplated. One embodiment of this design utilizes a hybrid of electroplated material as the top portion of the pole and a high moment sputtered flux enhancement layer. In this embodiment, a high moment magnetic film is first sputter deposited. The materials used here can be CoFeN with a magnetic moment of 24 kG, or FeXN (X=Rh, Al, Ta, Zr, Ti, etc) films with magnetic moments of 20–22 kG. Such films can be monolithic or laminated using thin dielectric layers or other magnetic lamination layers. The plating seed layer is deposited on the high magnetic moment layer, and photolithography processes is used to define the pole tip geometry. A Deep UV photolithography technique may be employed here since the wafer is planerized. The DUV photo process may be used in conjunction with a tri-level image transfer process. The electroplated portion of the pole tip is made of NiFe or CoNiFe alloys with a variety of compositions. The pole tip geometry and dimensions are finalized during pole trimming. In this process, ion milling or reactive ion beam etching is used to further reduce the trackwidth, and to create a notched structure of the pedestal.

DISCLOSURE OF INVENTION

Accordingly, it is an object of the present invention to produce a write head with a top pole which has a flat or nearly flat top surface.

Another object of the invention is to produce a write head which is more easily and precisely manufacturable.

And another object of the invention is to produce a write head in which critical dimensions are more easily controlled.

Yet another object of the present invention is to produce a write head with reduced track width.

A further object of the present invention is to produce a write head of a configuration such that advanced photolithography techniques such as DUV or EUV processing may be used, which may have very limited depth of focus.

Briefly, one preferred embodiment of the present invention is a disk drive write head having a bottom pole, a first insulation layer formed on the bottom pole, a coil formed on the first insulation layer, a second insulation layer formed on the coil, a write gap layer formed on the second insulation layer, and a top pole formed on the write gap layer, where the top pole is substantially flat.

Also disclosed are a slider, a computer disk drive and a method of fabrication for the write head.

An advantage of the present invention is that critical dimensions are more easily controlled during the fabrication process with a flat top pole.

Another advantage of the present invention is that magnetic properties of deposited material is improved with a flat top pole.

And another advantage of the present invention is that shadowing effects during dry etch processes are reduced.

A further advantage of the present invention is that there is generally less damage due to over-milling which may occur when attempting to eliminate shadowing effects.

A yet further advantage is that much smaller track widths are achievable with a write head produced by using the present invention.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
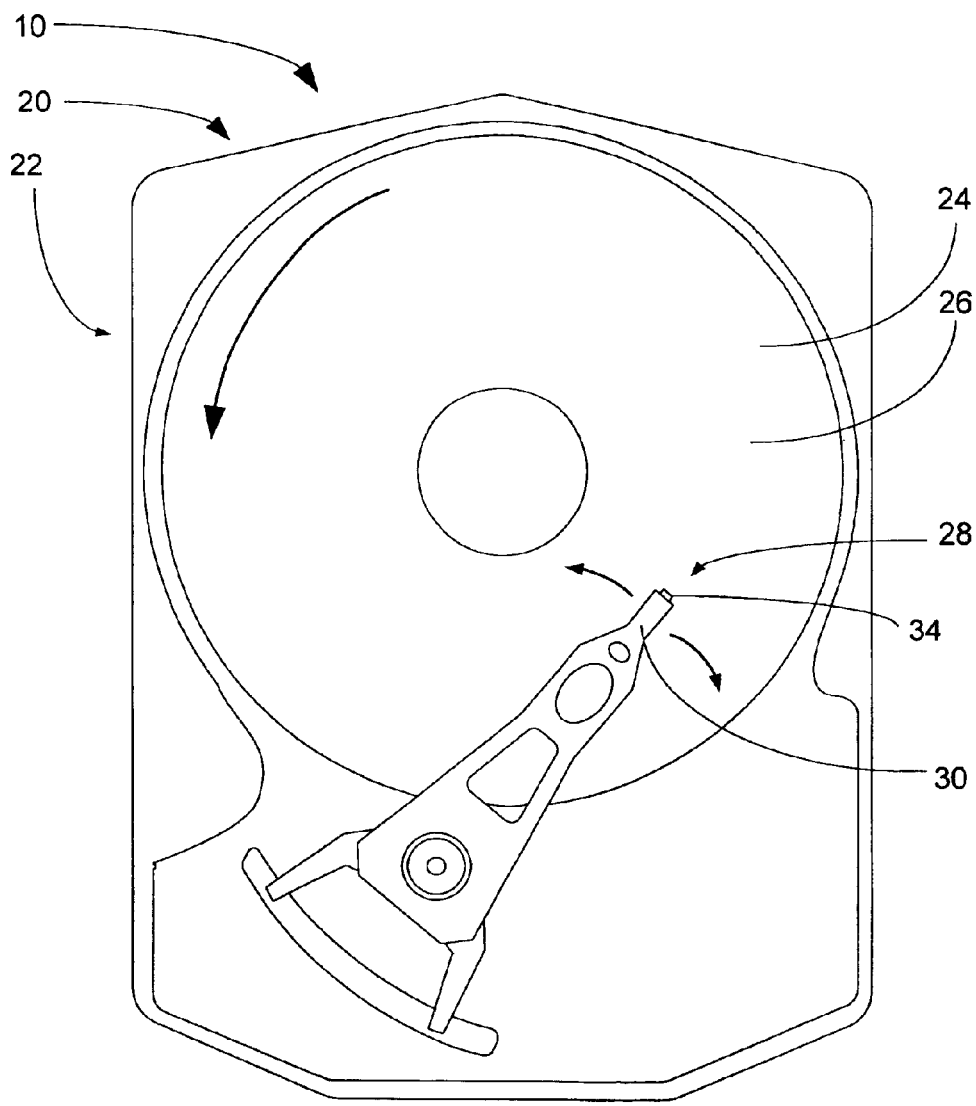
FIG. 1 shows a simplified top plan view of a disk drive.

FIG. 1 shows a simplified top plan view of a magnetic storage device 20, in this case a hard disk drive 22, which generally includes a magnetic storage medium 24, specifically a hard disk 26. A data read/write device 28 includes an arm 30, which supports a slider 34.

Figure 2:
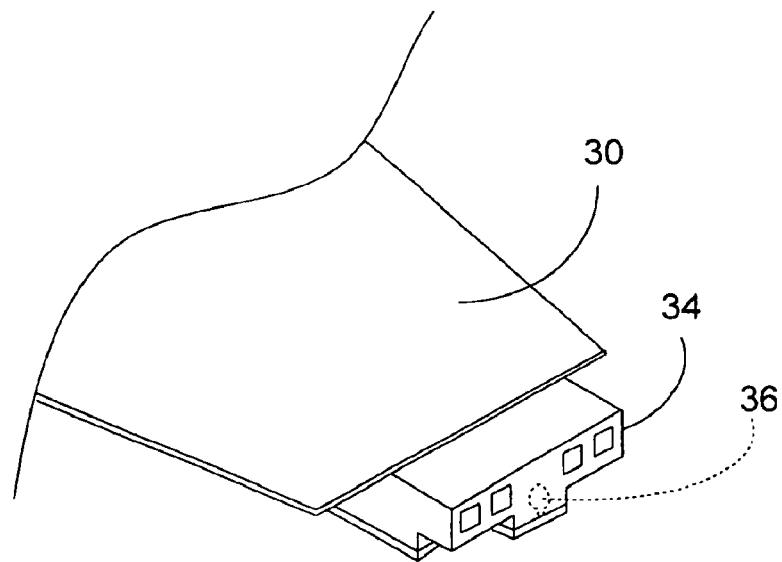
FIG. 2 shows an isometric detail view of the slider of a disk drive.

FIG. 2 illustrates a simplified isometric detail view of an arm 30 and a slider 34 into which a magneto-resistive head 36 has been embedded.

Figure 3:
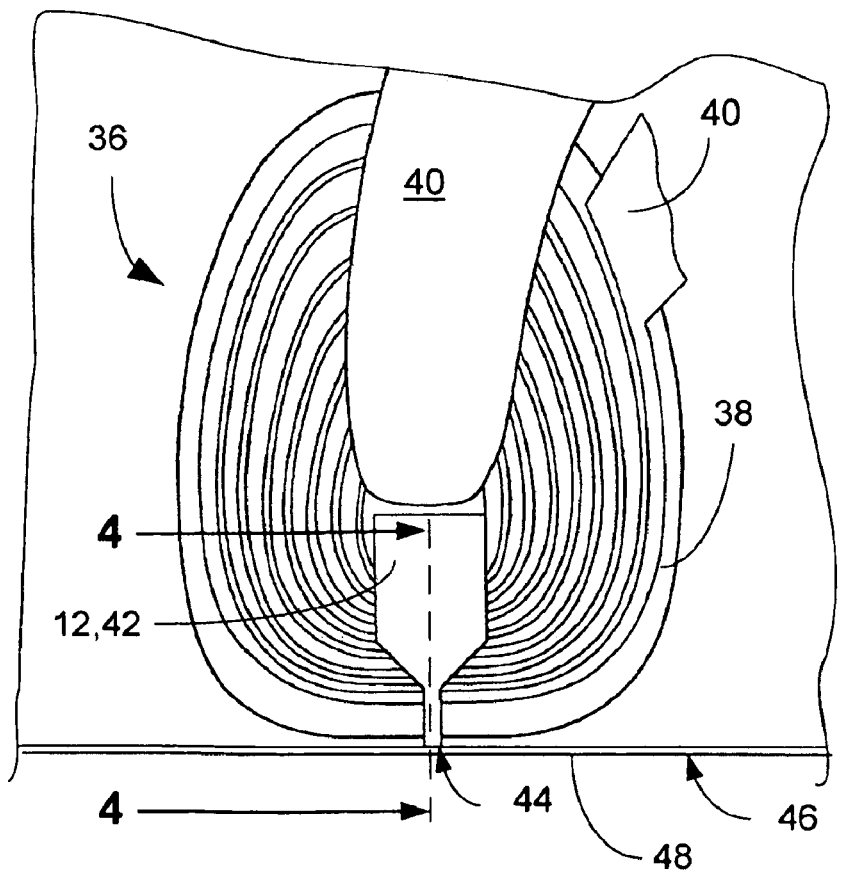
FIG. 3 illustrates a top plan view of a magneto-resistive read/write head.

FIG. 3 shows a top plan view of the components of the magneto-resistive head 36, including a coil 38, leads 40, a top pole piece 12, 42 having a pole tip 44. The surface facing the disk 26 (see FIG. 1) is supported by a layer of air which is established due to the rotation of the disk 26 under the slider 34, and which is known as the Air Bearing Surface or ABS 46. This ABS is covered with a protective coating 48.

Figure 4:
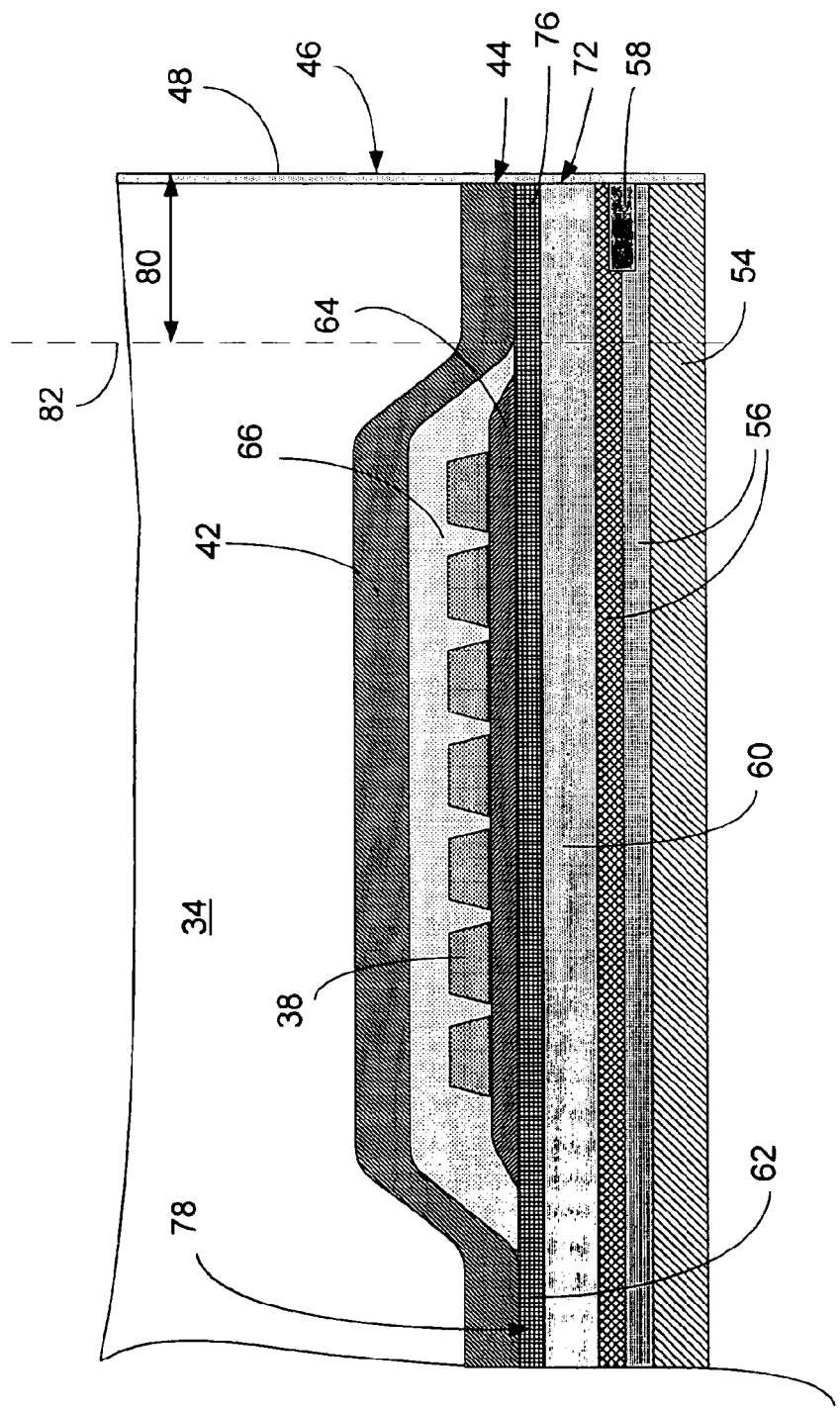
FIG. 4 shows a partial cross sectional view from section line 4—4 of FIG. 3, which has been turned to a horizontal orientation, of the magneto-resistive read/write head, showing the standard features used in the prior art.
Figure 5:
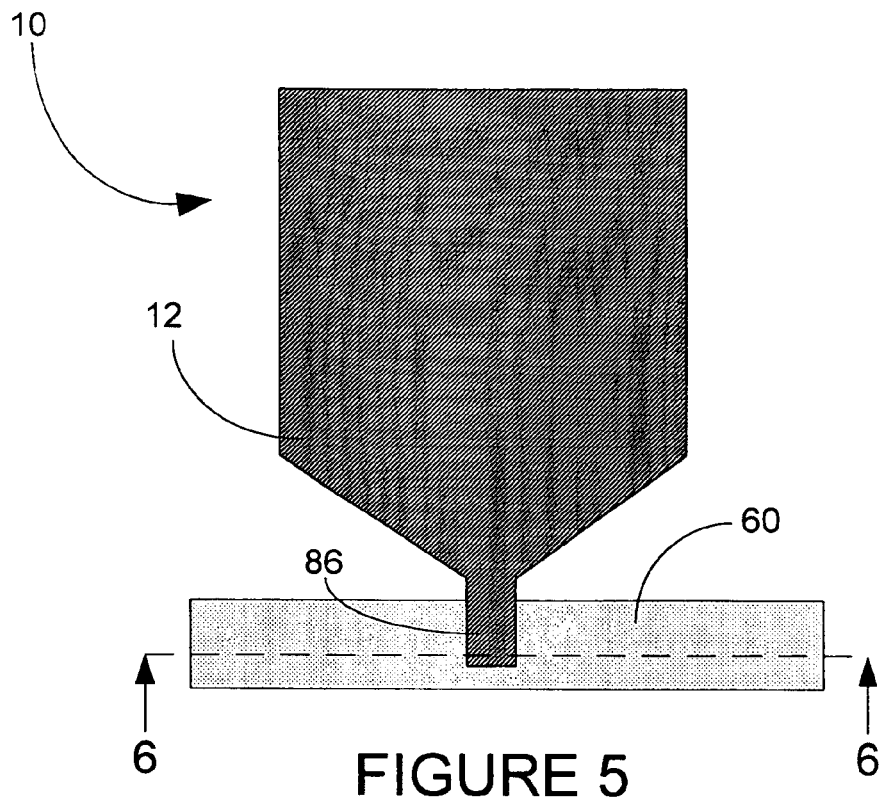
FIG. 5 shows a top plan view of the write head with a flat top pole of the present invention.
Figure 6:
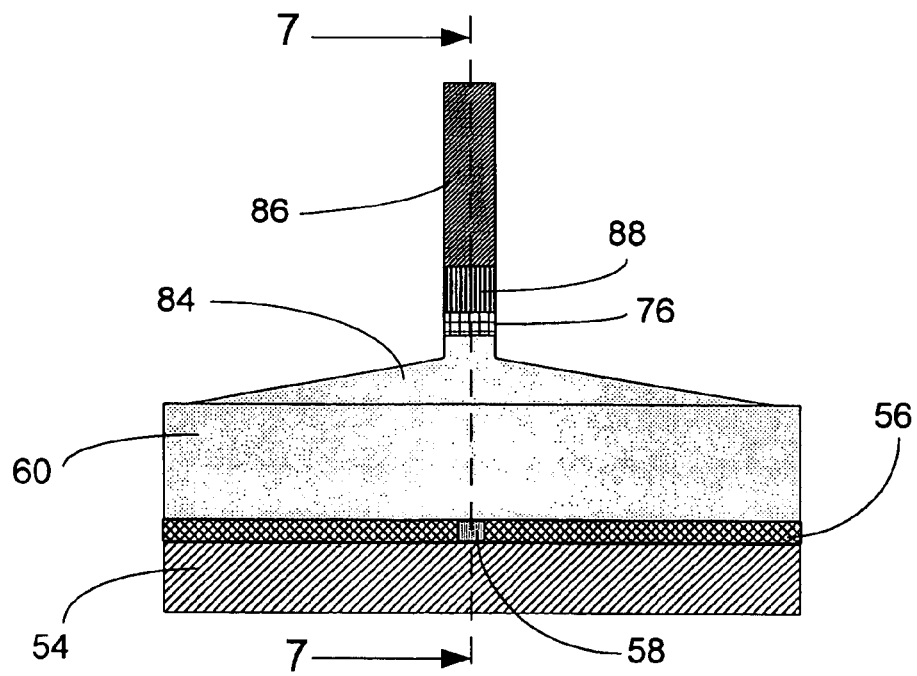
FIG. 6 illustrates a cross-sectional view of the write head with a flat top pole of the present invention as seen from section line 6—6 of FIG. 5.
Figure 7:
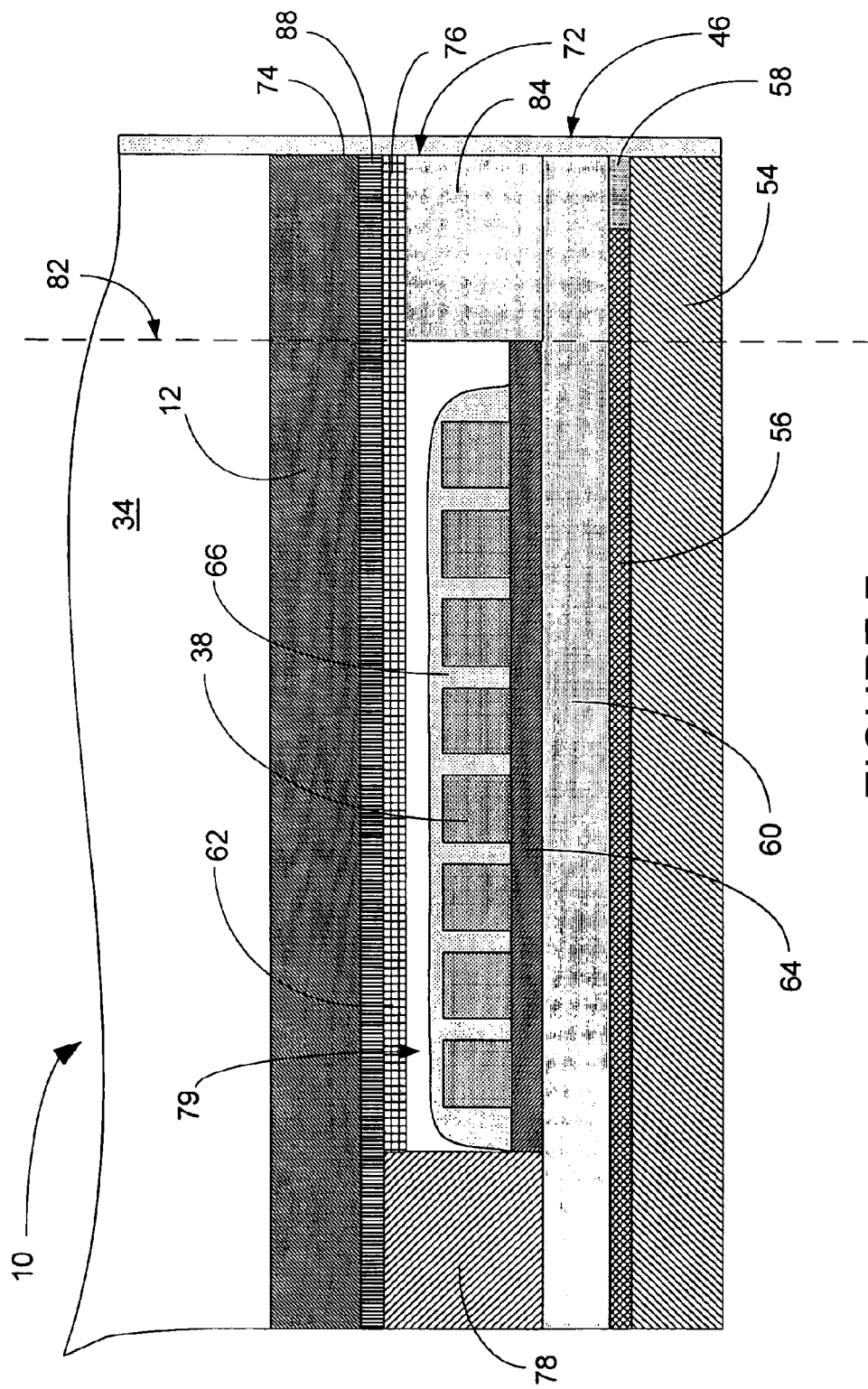
FIG. 7 shows a cross-sectional view of the write head with a flat top pole of the present invention as seen from section line 7—7 of FIG. 6.

FIGS. 4 and 7 are cross-sectional views taken through line 4—4 in FIG. 3, which are turned to a horizontal orientation. FIG. 4 shows the prior art for comparison, and FIGS. 5–7 show the preferred embodiment of the present invention. Certain elements are common to both the prior art and the present invention, and where these are similar, the same reference numbers will be used, in all figures. In this type of magneto-resistive head, both the read head and the write head are included on the same device, but it will be understood that the present invention is useful for devices in which the read head is separate from the write head.

The prior art, as seen in FIG. 4, will be described first. As described above, a typical prior art read/write head is shown in FIG. 4. Layers are generally deposited upon one another and generally include a shield layer 54, a dual gap layer 56, which surround a Magneto-resistive sensor, called MR sensor 58, a pole piece layer, which will be referred to as the bottom pole or P1 60, a non-magnetic gap layer 62, a first insulation layer or I1 64, upon which the coils 38 lie, and a second insulation layer, usually referred to as I2 66, which is generally made from photo-resist material. The top pole 42 is next, which is commonly referred to as P2. The bottom and top poles 60, 42 each have bottom and top pole tips 72, 44 respectively with pole write gap 76 between them. The ABS 46 and the coating layer 48 are also shown, as well as a back gap 78. The top and bottom poles 42, 60 typically extend backwards from the ABS 46 in a roughly parallel manner until the top pole 42 veers upward to accommodate the thickness of the coils 38 and insulation layers I1 64 and I2 66. The distance through which the poles 42, 60 travel in parallel before diverging is referred to as the throat height 80, and the point at which the divergence occurs is commonly referred to as the zero throat line 82.

In contrast, the write head with flat top pole 10 of the present invention is shown in FIGS. 5–7, and the following discussion will refer to all three figures, and particularly to FIG. 7. FIG. 5 is a top plan view of the write head 10, FIG. 6 is a cross-sectional view as taken through line 6—6 of FIG. 5, and FIG. 7 is a cross-sectional view as taken through line 7—7 of FIG. 6. Bottom pole (P1) 60 is shown formed on gap layer 56 which is on top of shield layer 54. Back gap 78, and a first insulation layer (I1) 64 are formed on the bottom pole 60, as well as a pedestal 84, which is actually an extension of the bottom pole 60. As seen from a front plan view of FIG. 6, it can be seen that the pedestal 84 is a truncated triangular shape which narrows toward the write gap 76. The write gap 76 is again formed of non-magnetic material which separates the bottom pole 60 from the top pole 12. Between the write gap 76 and the top pole 12 is a flux enhancement layer 88 of high moment magnetic material.

The top pole 12 is formed to be flat or substantially flat, preferably within a range of less than 0.5 microns, as opposed to a height of 2.5–3.0 microns in the prior art. This allows the top pole 12 to be formed without topographical features which cause manufacturing difficulties in the prior art, as referred to above. The precise control of deposition processes is more difficult when dealing with topography. Difficulties are especially encountered when using advanced photolithography techniques involving very short wavelengths of light. DUV or EUV light can only be adequately focused within a very shallow range of depth. Uniform thickness of photoresist material is difficult to achieve when there are variations in contour. Magnetic properties of deposited materials are also less uniform when processed onto a contoured surface. Additionally there are typically shadow effects when attempting to do dry etch processes near tall structures, as the etching beam is preventing from reaching into the bottom of topographical features. In order to completely clean out these areas, the tendency is to over-mill certain other surrounding areas while attempting to mill these shadowed areas properly. This can lead to destruction of other sensitive device areas. These difficulties are minimized or eliminated by the flat top pole 12 of the present invention 10.

As seen in FIG. 6, the top pole (P2) 12 is also narrowed into what is sometimes called a nose 86. The narrow dimension of the top and bottom poles 12, 60 at the write gap 76 determine the track width and also serve to channel the magnetic flux to increase the flux density across the write gap 76. The control problems in the prior art are compounded as the top pole becomes narrower and narrower and each dimensional error affects performance to a proportionally greater degree. The present invention 10 thus overcomes many of these manufacturing difficulties by eliminating topography, thus allowing better control of processes and materials.

The thickness of the coils 38 and surrounding insulation layers 64, 66 in the prior art, largely determine the topography of the top pole 12. The top pole tip 74 needs to be close to the bottom pole tip 72 near the ABS 46 in order for the magnetic flux not to be impermissibly attenuated. Yet, the coils 38 and insulation layers 64, 66 lie between the two pole layers 60, 42, and consequently, in the prior art (see FIG. 4) the top pole 42 has been curved in order to accommodate this thickness. In the present invention 10, in order to create the top pole 12 as a flat or nearly flat surface, the pedestal 84 acts as an extension of the bottom pole 60, thus creating a narrower write gap 76 separation while allowing the top pole 12 to be flat. In this configuration, the pedestal 84 defines the zero throat line 82, and is thus referred to as a Pedestal Defined Zero Throat or PDZT configuration. It should be understood however, that a PDZT configuration does not necessarily imply a top pole which is flat. There are previous PDZT configurations have not had the novel feature of a flat top pole 12 as in the present invention 10.

Figure 8:
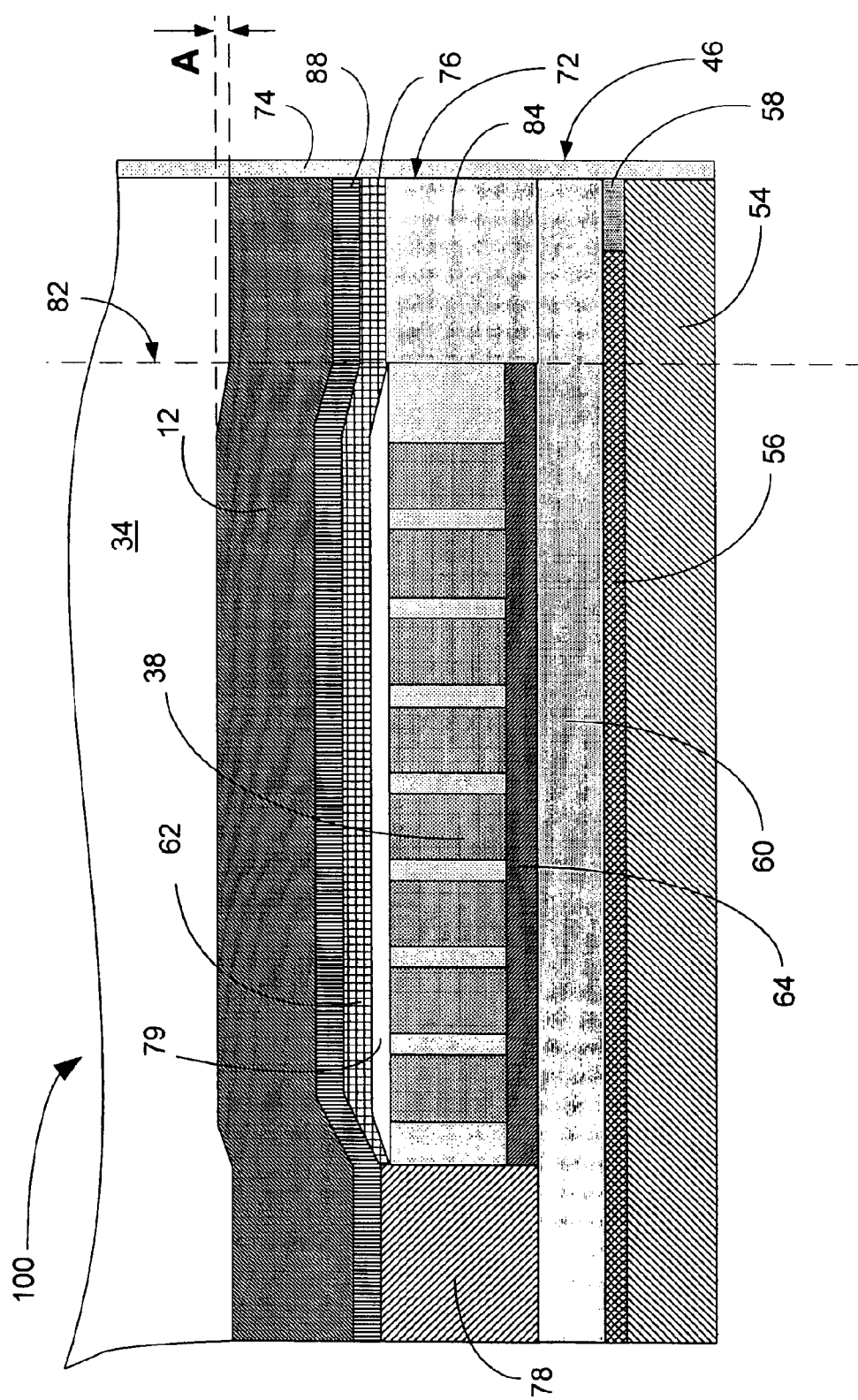
FIG. 8 shows a second preferred embodiment of the present invention which is produced by a damascene process.

FIG. 8 illustrates a second embodiment of the present invention which uses the damascene process, (described below) to produce a write head 100 with a substantially flat top pole 12. In this embodiment, the coils 38 are equal in height to the pedestal 84, and there is no second insulation layer 66 of the previous embodiment 10. Instead, the midcoat layer 79 covers the upper surface of the coils 38, and along with write gap layer 62, insulates them from the top pole 12 and enhanced layer 88. This layer of midcoat 79 on top of the coils 38 is very thin, less than a quarter of a micron, but it does cause some slight bulging of the layers above it. This is shown in the figure as being drastically exaggerated for viewing sake, as the gap layer 76, enhanced layer 88 and top pole 12, are shown to bulge upwards by the deviation shown at point A. However, this deviation is again only 0.25 microns, as opposed to 2.5–3.0 microns in the prior art, and this slight amount of deviation shall again be referred to as "substantially flat", within the limits discussed above in this specification.

Figure 9:
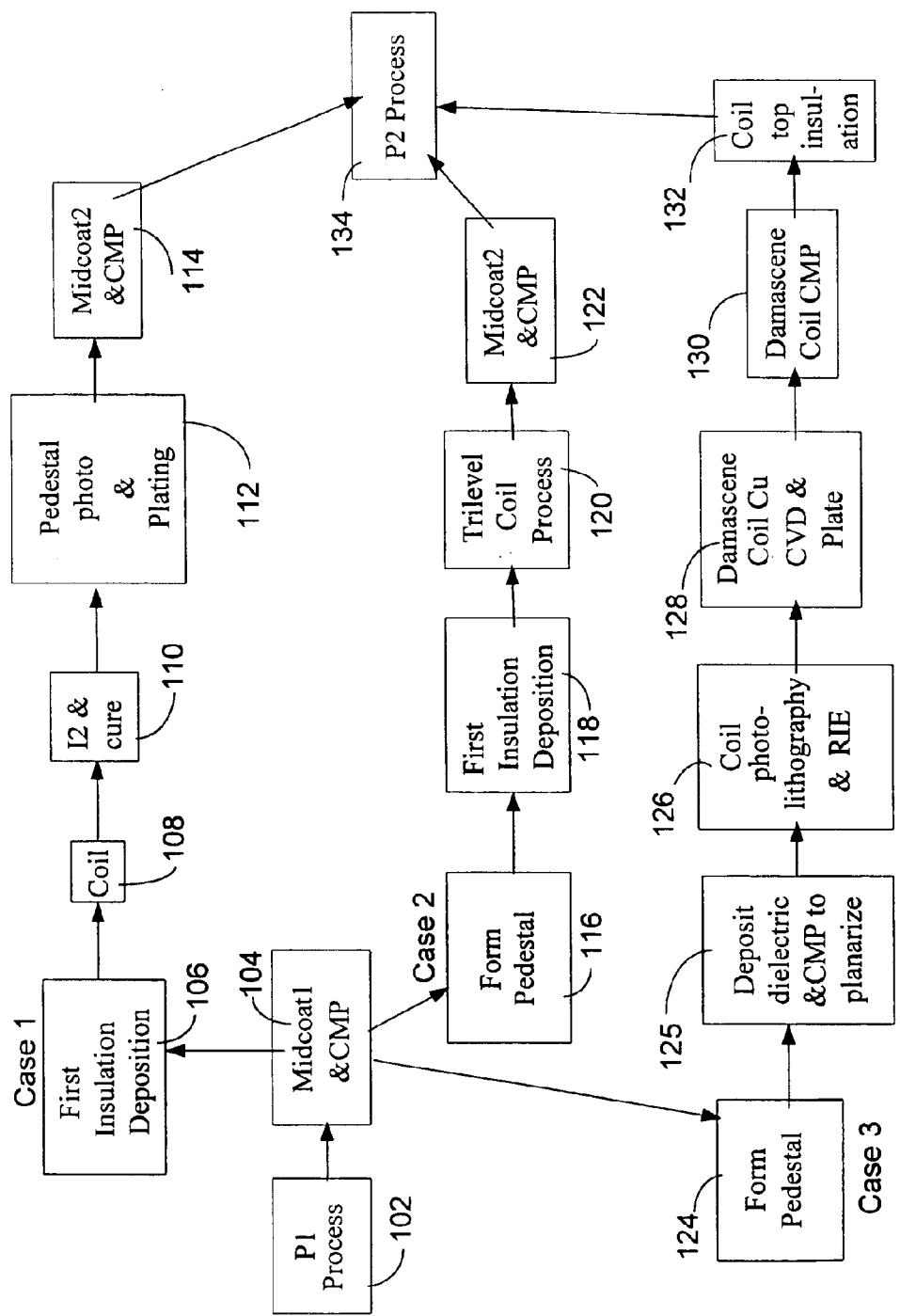
FIG. 9 illustrates a flow chart with three different variations of manufacturing method, which are labeled as Cases 1–3.

FIG. 9 shows a flowchart illustrating three methods of manufacture of the flat top pole write head 10, which are grouped in three parallel paths called here Cases 1–3. As shown, the three cases diverge after the second step 104. Thus all cases have steps 1 102 and 2 104 described below, as well as the final processing step 4 134 in common. These steps are as follows:

1) P1 patterning and plating 102;
2) Planerize P1 together with first midcoat of $Al_2O_3$ 104;

Case I.
  A) Deposit first insulation layer for coil 106;
  B) Coil processes 108;
  C) Cover coil with photoresist second insulation layer and cure 110;
  D) Pedestal photolithography process and plating 112; and
  E) Deposit second midcoat layer 114.

Case II.
  A) Form the pedestal by either sputter deposition and patterning using ion milling or plating the pedestal into photo-resist mask 124;
  B) Deposit first insulation layer for coil 118;
  C) Use tri-level photo process to define coil structure followed by plating 120;
  D) Deposit second midcoat layer $Al_2O_3$ and Chemical Mechanical Polishing (CMP) 122.

In this process, the coils are inset below the pole tip topography onto an insulation layer (I1). In order to overcome the topography in the coil photo process the tri-level image transfer technique may be required. The following steps are needed for such process:

a) Spin coat a planerizing photoresist, deposit a hard mask $SiO_2$, spin coat and pattern an imaging photoresist layer;
b) Use Reactive Ion Etching (RIE) to pattern the hard mask (e.g. using $CHF_3$ or $CHF_4$ containing etching process);
c) Use RIE to pattern the bottom photoresist layer (e.g. using $O_2$ plasma);
c) Electroplating Cu coil;
d) Hard mask and photoresist removal; and
e) Etch the Cu or Ti/Cu seed (e. g. using ion milling or wet etching).

Case III.
  A) Form the pedestal by either sputter deposition and patterning using ion milling or plating the pedestal into photo-resist mask 124;
  B) Deposit dielectric layer, use photolithography and reactive ion etching to create trenches for coil pattern 126;
  C) Deposit Cu seed by Chemical Vapor Deposition (CVD) and Cu plating 128;
  D) CMP to remove field Cu and planerize 130; and
  E) Deposit top insulation layer for coil 132.

The following are some details about damascene coil process (Steps B–D):

a) Deposit thick layer of dielectric, preferably $SiO_2$. A chemical vapor deposition or sputter depostion may be used. A relatively thin $Al_2O_3$ layer may be deposited first before $SiO_2$ to be used as etch stopper during the reactive ion etching process. CMP is used to planarize $SiO_2$ and the pedestal which is made of magnetic or non-magnetic material;
b) Pattern the photoresist to define the coil structure;
c) Use RIE to anisotropically etch $SiO_2$ using photoresist as hard mask;
d) Deposit Cu seed using CVD technique to ensure good step coverage of the seed layer. Ta or TaN layer may be deposited prior to Cu seed for CMP stopping layer and diffusion barrier.
e) Electroplate Cu to fill the trenches on $SiO_2$.
f) Chemical mechanical polishing of the Cu to define the coil; and
g) Remove Ta or TaN barrier layer.

The top pole P2 is fabricated 134.

The following are details of fabricating top pole P2 with sputtered high magnetic moment flux enhancement layer:

a) Sputter deposit high magnetic moment materials for top pole, which may be monolithic or laminated. Laminated films may include thin dielectric layer or other magnetic or non-magnetic lamination layers;
b) Sputter deposit plating seed of NiFe or CoNiFe;
c) Perform photolithography of P2P. Deep UV with or without tri-level image transfer technique can be used;
d) Electroplate the top portion of P2 pole tip, followed by photoresist removal and seed ion mill;
e) An extensive ion milling is required to mill through the sputtered high moment layer and the NiFe seed. Another photo and wet etching is generally used to remove the plating field; and
f) Define a photoresist mask to trim the pole tip. An ion milling may be used to trim the pole to the desired geometry and shape. In order to create a notched structure in the pedestal, it is generally required to remove the write gap first by using reactive ion beam etching (RIBE) or reactive ion etching (RIE), or ion milling. Another ion milling step is used to form the notch.

It should be noted that especially in Case III, the top pole P2 will not be completely flat, but whatever topography there is will be drastically reduced from that which is typical for the prior art. Thus, the top pole P2 will be considered to be substantially flat, this term being used to denote a surface whose topography varies only within a range of 0.5 microns or less over a length of approximately 5 microns around the ABS.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A disk drive write head comprising:
  a bottom pole, said bottom pole including a pedestal portion;
  a first insulation layer formed on said bottom pole;
  a coil formed on said first insulation layer;
  a second insulation layer formed on said coil, the second insulation layer being substantially aligned with said pedestal portion;
  a write gap layer formed on said second insulation layer and said pedestal portion;
  a flux enhancement layer of high magnetic moment material formed on said write gap layer and covering the coil and the pedestal portion, the flux enhancement layer being substantially flat; and a top pole formed on the flux enhancement layer adjacent the coil and the pedestal portion, said top pole being substantially flat.

2. The disk drive write head as recited in claim 1, wherein:

said disk drive write head includes a read head.

3. A slider for reading data from a disk surface, said slider including a disk drive write head, said head comprising:

- a bottom pole, said bottom pole including a pedestal portion;
- a first insulation layer formed on said bottom pole;
- a coil formed on said first insulation layer;
- a second insulation layer formed on said coil, the second insulation layer being substantially aligned with said pedestal portion;
- a write gap layer formed on said second insulation layer and said pedestal portion;
- a flux enhancement layer of high magnetic moment material formed on said write gap layer and covering the coil and the pedestal portion, the flux enhancement layer being substantially flat; and
- a top pole formed on the flux enhancement layer adjacent the coil and the pedestal portion, said top pole being substantially flat.

4. The slider as recited in claim 3, wherein:

said disk drive write head includes a read head.

5. A computer disk drive having a slider for reading data from a disk surface, said slider including a disk drive write head, said head comprising:

- a bottom pole, said bottom pole including a pedestal portion;
- a first insulation layer formed on said bottom pole;
- a coil formed on said first insulation layer;
- a second insulation layer formed on said coil, the second insulation layer being substantially aligned with said pedestal portion;
- a write gap layer formed on said second insulation layer and said pedestal portion;
- a flux enhancement layer of high magnetic moment material formed on said write gap layer and covering the coil and the pedestal portion, the flux enhancement layer being substantially flat; and
- a top pole formed on the flux enhancement layer adjacent the coil and the pedestal portion, said top pole being substantially flat.

6. The computer disk drive as recited in claim 5, wherein:

said disk drive write head includes a read head.

* * * * *